(12) United States Patent
Zhang et al.

(10) Patent No.: US 12,355,293 B2
(45) Date of Patent: Jul. 8, 2025

(54) CHARGING METHOD, ELECTRONIC DEVICE AND STORAGE MEDIUM

(71) Applicant: Beijing Xiaomi Mobile Software Co., Ltd., Beijing (CN)

(72) Inventors: Jinlong Zhang, Beijing (CN); Renjie Chen, Beijing (CN); Zhiming He, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 695 days.

(21) Appl. No.: 17/681,089

(22) Filed: Feb. 25, 2022

(65) Prior Publication Data

US 2023/0044545 A1    Feb. 9, 2023

(30) Foreign Application Priority Data

Aug. 9, 2021  (CN) .......................... 202110907589.3

(51) Int. Cl.
*H02J 7/00*  (2006.01)

(52) U.S. Cl.
CPC ...... *H02J 7/007194* (2020.01); *H02J 7/0048* (2020.01)

(58) Field of Classification Search
None
See application file for complete search history.

(56) References Cited

U.S. PATENT DOCUMENTS

| | | |
|---|---|---|
| 5,565,759 A | 10/1996 | Dunstan |
| 2013/0119942 A1 | 5/2013 | Sutarwala et al. |
| 2021/0152011 A1* | 5/2021 | Deng ................. H01M 10/482 |

FOREIGN PATENT DOCUMENTS

CN    108288872 A    7/2018

OTHER PUBLICATIONS

European Search Report issued Aug. 26, 2022 for European Patent Application No. 22158964.1.

* cited by examiner

*Primary Examiner* — Arun C Williams
(74) *Attorney, Agent, or Firm* — Volpe Koenig (57) ABSTRACT

A charging method, including: obtaining the number of charge-discharge cycles of a battery and an application scenario during charging; determining a target charging mode among at least two charging modes according to the number of charge-discharge cycles and the application scenario, in which different charging modes have different charging rates, and the charging modes with different charging rates have different charging damages to the battery; and charging the battery in the target charging mode.

19 Claims, 3 Drawing Sheets

CHARGING METHOD, ELECTRONIC DEVICE AND STORAGE MEDIUM

CROSS REFERENCE TO RELATED APPLICATION

The application is provided based on and claims priority to the Chinese Patent Application No. 2021109075893, filed to the Chinese Patent Office on Aug. 9, 2021, the entire contents of which are incorporated herein by reference.

BACKGROUND

With increasing diversity of functions of an electronic device, power consumption of the electronic device increases, performance of a battery turns out to be a major concern. In general, the battery will be aged after charged repeatedly. Furthermore, some existing inappropriate charging strategies further accelerate battery aging, consequently, cell impedance and the like in the battery increase, an available capacity of the battery is reduced, the performance of the battery is affected, and use experience of the battery and the electronic device is affected.

SUMMARY

The present disclosure provides a charging method, an electronic device and a storage medium.

According to a first aspect of the present disclosure, a charging method is provided and includes:

obtaining the number of charge-discharge cycles of a battery and an application scenario during charging;

determining a target charging mode among at least two charging modes according to the number of charge-discharge cycles and the application scenario, in which different charging modes have different charging rates, and the charging modes with different charging rates have different charging damages to the battery; and charging the battery in the target charging mode.

According to a second aspect of the present disclosure, an electronic device is provided and includes:

a processor; and a memory, configured to store processor-executable instructions.

The processor is configured to: execute steps of the method according to the first aspect of the disclosure.

According to a third aspect of the present disclosure, a non-transitory computer readable storage medium is provided storing a computer program thereon. When an instruction in the storage medium is executed by a processor of an electronic device, the electronic device is enabled to execute and implement steps of the method according to the first aspect.

It should be understood that the above general description and the following detailed description are only exemplary and explanatory instead of limiting the present disclosure.

BRIEF DESCRIPTION OF THE DRAWINGS

The accompanying drawings, which are incorporated in and constitute a part of this specification, illustrate examples consistent with the present disclosure and together with the specification serve to explain the principles of the present disclosure.

DETAILED DESCRIPTION

Examples will be described in detail herein, instances of which are illustrated in the accompanying drawings. When the following description refers to the accompanying drawings, the same numbers in different drawings represent the same or similar elements unless otherwise indicated. The implementations described in the following examples do not represent all implementations consistent with the present disclosure. Rather, they are merely examples of an apparatus consistent with some aspects of the present disclosure as detailed in the appended claims.

Figure 1:
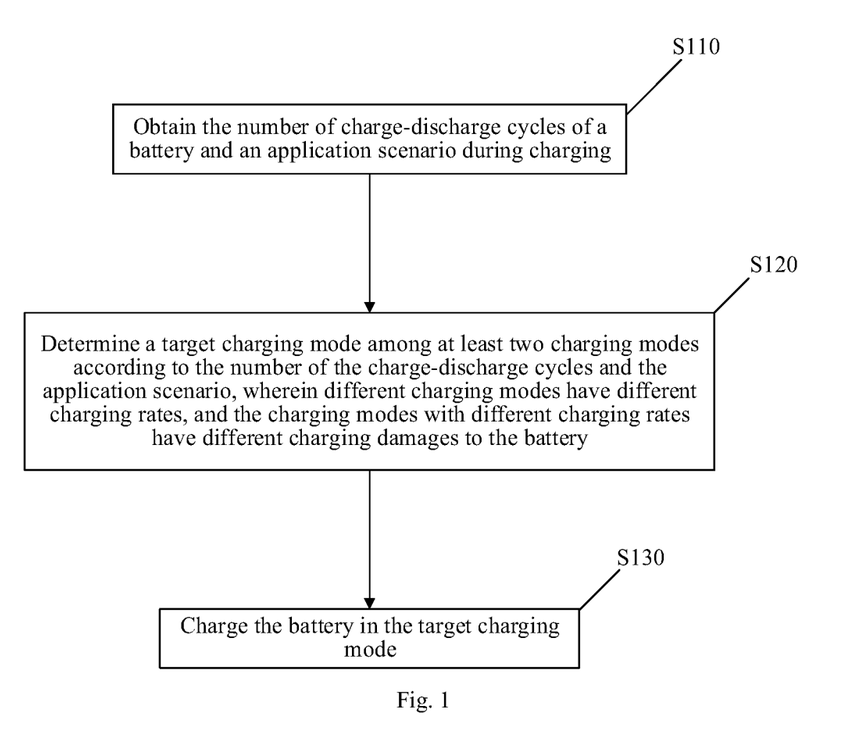
FIG. 1 is a flowchart of a charging method according to an example.

An example of a first aspect of the present disclosure provides a charging method, as shown in FIG. 1, including step S110, the number of charge-discharge cycles of a battery and an application scenario during charging are obtained. Then in step S120, a target charging mode is determined among at least two charging modes according to the number of charge-discharge cycles and the application scenario, in which different charging modes have different charging rates, and the charging modes with different charging rates have different charging damages to the battery. Finally in step S130, the battery is charged in the target charging mode. Optionally, the charging rate is an average charging rate in corresponding charging mode.

In general, the larger the number of the charge-discharge cycles is, the greater an aging degree of the battery is. Different charging strategies are selected according to different aging degrees of the battery, which is beneficial to delay the aging speed of the battery and to better protect the battery.

The application scenario during charging can reflect a power demand, meanwhile the charging mode is determined according to the number of charge-discharge cycles and the application scenario, which can take into account a user demand and reduce the damage to the battery. For example: a charging mode with smaller damage to the battery can be adopted without an emergency of the power demand, and a charging mode with higher charging rate can be adopted in a case of an emergency of the power demand.

In some examples, one charge-discharge cycle refers to the discharge amount reaching a preset ratio of a battery capacity. The preset ratio may be 80%, 85%, 90% or 95%, etc., but is not limited to this. For example: the battery capacity is C, and one charge-discharge cycle is recorded when the discharge amount is 90% C.

Unrestrictively, during actual application, during battery discharging, the discharge amount of the battery can be calculated through a Coulomb integral. In some examples, the charging rate of the charging mode is inversely correlated to the charging damage of the charging mode to the battery.

Compared with adopting only one charging mode within a cycle life of the battery, the technical solution of the example of the present disclosure is to select different charging modes as the target charging mode according to the number of the charge-discharge cycles and the application scenarios, so that the charging modes can meet charging demands of different application scenarios and effectively adapt to the aging degree of the battery, improving the aging condition of the battery, improving the cycle life and the security of the battery, and improving the use experience.

In the example of the present disclosure, a ratio of a target charging mode with a higher charging rate within the number of the charge-discharge cycles of the battery can be increased by selecting different target charging modes to improve the aging state of the battery.

For example: the charting modes include a fast charging mode and an ordinary charging mode, the charging rate of the fast charging mode is greater than that of the ordinary charging mode. Compared with adopting only one charging mode within the cycle life of the battery, after adopting the charging method according to the present disclosure, it can be guaranteed that the battery has fast charging experience for longer than one year. That is, according to the example of the present disclosure, the number of charge-discharge cycles adopting the fast charging mode as the target charging mode accounts for a larger proportion of the total number of charge-discharge cycles within the cycle life of the battery.

In other examples, determining the target charging mode among the at least two charging modes according to the number of charge-discharge cycles and the application scenario includes: whether a charging mode with a first preset charging rate is selected among the at least two charging modes to serve as the target charging mode is determined according to a temperature of the battery, in response to the number of the charge-discharge cycles does not reach a preset number and the application scenario is a first type of charging scenario.

The first type of charging scenario is a scenario in which a state of charge of the battery is lower than a power threshold, or a scenario in which detecting an indication of emergency charging.

The preset number may be determined according to actual design parameters of the battery, unrestrictively, the preset number may be any one of 100, 150, 200, 250, 300 or 350 or between any two of them.

The charging mode with the first preset charging rate is greater than the charging mode with the lowest charging rate of the at least two charging modes. For example: the charging mode with the first preset charging rate is the charging mode with the highest charging rate of the at least two charging modes.

In general, charging of the battery in a preset temperature can better protect the cycle life of the battery, while charging of the battery in a temperature higher than or lower than the preset temperature will accelerate aging of the battery.

If the number of the charge-discharge cycles does not reach the preset number, it indicates that the aging degree of the battery is small, so there are more selections of the target charging mode. If the number of the charge-discharge cycles reaches the preset number, it indicates that the aging degree of the battery is large, so there are fewer selections of the target charging mode.

The number of the charge-discharge cycles not reaching the preset number is one of preconditions under which the charging mode with the first preset charging rate can be selected as the target charging mode, which is beneficial to further reduce the damage to the battery and to guarantee the cycle life of the battery.

Selection of the target charging mode is performed with reference to the number of the charge-discharge cycles and the temperature of the battery, and the charging rate and reduction of the damage to the battery are further considered.

The first type of charging scenario indicating the emergency charging includes: a user inputs or selects an instruction indicating the emergency charging through an interactive interface of an electronic device.

The power threshold may be but is not limited to 5%, 10% or 20% of the battery capacity.

In other examples, determining the target charging mode among the at least two charging modes according to the number of charge-discharge cycles and the application scenario includes determining that a charging mode with the charging rate being lower than the first preset charging rate is selected among the at least two charging modes to serve as the target charging mode, in response to the number of charge-discharge cycles not reaching the preset number and the application scenario is a second type of charging scenario. The second type of charging scenario is a scenario in which the state of charge of the battery is not lower than the power threshold, or a scenario in which not detecting an indication of the emergency charging.

When the application scenario is the second type of charging scenario, it is indicated that the user has no demand for emergency power, at the moment, the charging mode with the charging rate being lower than the first preset charging rate is selected in spite of the temperature of the battery, which does not affect the user demand and is beneficial to reduce the damage to the battery caused by higher charging rate, and can improve the cycle life of the battery.

The charging rate being lower than the first preset charging rate may refer to the charging rate being only lower than the highest charging rate, namely, a charging mode with a highest charging rate among the remaining optional charging modes except the charging mode with the highest charging rate among all the optional charging modes.

In other examples, determining whether the charging mode with the first preset charging rate is selected among the at least two charging modes to serve as the target charging mode according to the temperature of the battery in response to the number of the charge-discharge cycles not reaching the preset number and the application scenario being the first type of charging scenario includes at least one of the following: determining that the charging mode with the first preset charging rate is selected among the at least two charging modes to serve as the target charging mode in response to the temperature of the battery being within a preset temperature range; and determining that the charging mode with a charging rate lower than the first preset charging rate is selected among the at least two charging modes to serve as the target charging mode in response to the temperature of the battery being beyond the preset temperature range.

In some examples, it is determined that the charging mode with the highest charging rate is selected among the at least two charging modes to serve as the target charging mode in response to the number of charge-discharge cycles not reaching the preset number, the application scenario being the first type of charging scenario and the temperature of the battery being within the preset temperature range.

In all cases except the above case, the charging mode with a charging rate lower than the highest charging rate is selected as the target charging mode to further improve the cycle life of the battery.

The temperature being beyond the preset temperature range includes the temperature being lower than a minimum temperature value of the preset temperature range, or the temperature being higher than a maximum temperature value of the preset temperature range. For example: the preset temperature range may be 5-30° C., and if the temperature is lower than 5° C. or the temperature is higher than 30° C., it means that the temperature is beyond the preset temperature range.

In other examples, after it is determined that the charging mode with a charging rate lower than the first preset charging rate is selected among the at least two charging modes to serve as the target charging mode in response to the application scenario being the first type of charging scenario and the temperature of the battery being beyond the preset temperature range, the method further includes switching the target charging mode to the charging mode with the first preset charging rate in response to the temperature of the battery being restored to be within the preset temperature range.

If the number of the charge-discharge cycles does not reach the preset number, the application scenario is the first type of the charging scenario, and the temperature of the battery changes from being beyond the preset temperature range to be within the preset temperature range, the target charging mode will changes accordingly, and the charging rate is further guaranteed while the charging damage to the battery is reduced.

In some examples, the method further includes: the target charging mode is determined before charging or redetermined during charging. Determining the target charging mode during charging includes: the target charging mode is determined at a preset period or based on an update of trigger time.

In some examples, the method further includes: the temperature of the battery is monitored, and when it is detected that a rising rate of the temperature of the battery reaches a preset threshold, the target charging mode is redetermined. By adjusting the target charging mode in time, charging efficiency can be monitored, and a protection effect on the battery can be provided.

In other examples, determining the target charging mode among the at least two charging modes according to the number of the charge-discharge cycles and the application scenario includes a charging mode with a second preset charging rate or a charging mode with a third preset charging rate is determined to serve as the target charging mode according to the temperature of the battery in response to the number of the charge-discharge cycles reaches the preset number. The charging damage of the charging mode with the second preset charging rate to the battery is lower than the damage of the charging mode with the first preset charging rate to the battery but is larger than the charging damage of the charging mode with the third preset charging rate to the battery. The second preset charging rate is smaller than the first preset charging rate but is larger than the third preset charging rate.

Compared with the number of the charge-discharge cycles not reaching the preset number, after the number of the charge-discharge cycles reaches the preset number, the aging degree of the battery is larger, at the moment, the charging mode with the second preset charging rate or the charging mode with the third preset charging rate is selected as the target charging mode, so the charging damage to the battery is reduced further, intelligent switching of the target charging mode is realized, and user experience is further improved.

In other examples, determining the charging mode with the second preset charging rate or the charging mode with the third preset charging rate to serve as the target charging mode according to the temperature of the battery in response to the number of charge-discharge cycles reaching the preset number, includes determining that the charging mode with the third preset charging rate is selected among the at least two charging modes to serve as the target charging mode in response to the number of the charge-discharge cycles reaching the preset number and the temperature of the battery being beyond the preset temperature range; and/or the charging mode with the second preset charging rate is determined to serve as the target charging mode in response to the number of the charge-discharge cycles reaching the preset number and the temperature of the battery being within the preset temperature range.

When the temperature is beyond the preset temperature range, the aging degree of the battery is prone to being more serious, at the moment, a preset charging mode with a lower charging rate and less charging damage to the battery is selected as the target charging mode, and the charging rate can be guaranteed while the charging damage to the battery can be reduced.

In other examples, after the charging mode with the third preset charging rate is determined to serve as the target charging mode in response to the number of the charge-discharge cycles reaching the preset number and the temperature of the battery being beyond the preset temperature range, the method further includes switching the target charging mode to the charging mode with the second preset charging rate in response to the temperature of the battery being restored to be within the preset temperature range.

When the temperature is restored to be within the preset temperature range, by switching the target charging mode to the charging mode with higher charging rate, the charging rate is guaranteed, and user experience is further improved.

In some examples, the charging modes include a first charging mode, a second charging mode and a third charging mode.

A charging rate of the second charging mode is smaller than that of the first charging mode but is larger than that of the third charging mode. That is, the first charging mode has the first preset charging rate, the second charging mode has the second preset charging rate, and the third charging mode has the third preset charging rate; and the charging damage of the second charging mode to the battery is smaller than the charging damage of the first charging mode to the battery but is larger than the charging damage of the third charging mode to the battery.

The first charging mode is determined to serve as the target charging mode in response to the number of the charge-discharge cycles not reaching the preset number, the application scenario being the first type of charging scenario, and the temperature of the battery being within the preset temperature range; and/or the second charging mode or the third charging mode is determined to serve as the target charging mode in response to the number of the charge-discharge cycles not reaching the preset number and the application scenario is the second type of charging scenario.

Determining the target charging mode among the at least two charging modes according to the number of the charge-discharge cycles and the application scenario, includes at least one of the following: the third charging mode is determined to serve as the target charging mode in response to the number of the charge-discharge cycles reaching the preset number and the temperature of the battery being beyond the preset temperature range; and the second charging mode is determined to serve as the target charging mode in response to the number of the charge-discharge cycles reaching the preset number and the temperature of the battery being within the preset temperature range.

In an example, the charging modes include a first charging mode, a second charging mode and a third charging mode. The first charging mode is the fast charging mode, the second charging mode is the ordinary charging mode, and the third charging mode is a low-rate charging mode. A charging rate of the ordinary charging mode is smaller than that of the fast charging mode but is larger than that of the low-rate charging mode. The charging damage of the ordinary charging mode to the battery is smaller than the charging damage of the fast charging mode to the battery but is larger than the charging damage of the low-rate charging mode to the battery. The application scenario (marked as F) includes a first type of application scenario (marked as F=1) and a second type of application scenario (marked as F=0), and F=0 is the default in general unless an instruction of the application scenario F1 is received. β represents a limit value; when the temperature of the battery is within the preset temperature range and F=1, β=1; and when the temperature of the battery is beyond the preset temperature range, for example, the temperature of the battery is too high or too low, β=0 in spite of how much an F value is. When the target charging mode is to be determined, if the number of the charge-discharge cycles is smaller than the preset number and β=1, the fast charging mode is selected as the target charging mode.

If the number of the charge-discharge cycles is smaller than the preset number and β=0, the ordinary charging mode is selected as the target charging mode.

If the number of the charge-discharge cycles is greater than or equal to the preset number and β=1, the ordinary charging mode is selected as the target charging mode.

If the number of the charge-discharge cycles is greater than or equal to the preset number and β=0, the low-rate charging mode is selected as the target charging mode.

By means of the charging method of the example, the charging speed is increased for user, the security of the battery is guaranteed, the cycle life of the battery is improved, and the aging condition of the battery is improved. Besides, through intelligent identification of the fast charging mode, the ordinary charging mode and the low-rate charging mode, it can be guaranteed that the user can perform fast charging in a scenario needing fast charging, such as on a business trip, and battery endurance concern of the user is relieved; and with aging of the battery, the charging mode is intelligently switched, the battery life is guaranteed, and long-time use experience of the user is improved.

Figure 2A:
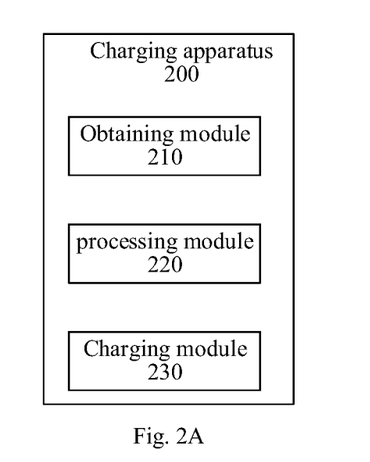
FIG. 2A is schematic structural diagram of a charging apparatus according to a first example.

An example of a second aspect of the preset disclosure provides a charging apparatus, as shown in FIG. 2A. The apparatus 200 includes an obtaining module 210, configured to obtain the number of charge-discharge cycles of a battery and an application scenario during charging. The apparatus 200 further includes a processing module 220, configured to determine a target charging mode among at least two charging modes according to the number of the charge-discharge cycles and the application scenarios, in which different charging modes have different charging rates, and the charging modes with different charging rates have different charging damages to the battery. Additionally, the apparatus 200 includes a charging module 230, configured to charge the battery in the target charging mode.

In some examples, the processing module 220 is further configured to determine whether a charging mode with a first preset charging rate is selected among the at least two charging modes to serve as the target charging mode according to a temperature of the battery in response to the number of the charge-discharge cycles not reaching a preset number and the application scenario being a first type of charging scenario.

The first type of charging scenario is a scenario in which a state of charge of the battery is lower than a power threshold, or a scenario in which detecting an indication of emergency charging.

In some examples, the processing module 220 is further configured to determine that the charging mode with the charging rate being lower than the first preset charging rate is selected among the at least two charging modes to serve as the target charging mode in response to the number of charge-discharge cycles not reaching the preset number and the application scenario is a second type of charging scenario. The second type of charging scenario is a scenario in which the state of charge of the battery is not lower than the power threshold, or a scenario in which not detecting an indication of the emergency charging.

In some examples, the processing module 220 is further configured to perform at least one of: determining that the charging mode with the first preset charging rate is selected among the at least two charging modes to serve as the target charging mode in response to the temperature of the battery being within a preset temperature range; and determining that the charging mode with the charging rate lower than the first preset charging rate is selected among the at least two charging modes to serve as the target charging mode in response to the temperature of the battery being beyond the preset temperature range.

Figure 2B:
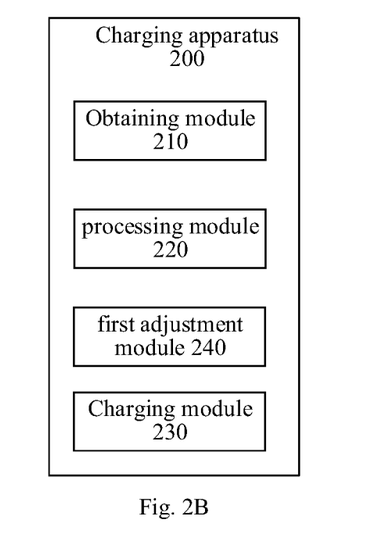
FIG. 2B is schematic structural diagram of a charging apparatus according to a second example.

In some examples, as shown in FIG. 2B, the apparatus 200 further includes a first adjustment module 240, configured to switch the target charging mode to the charging mode with the first preset charging rate in response to the temperature of the battery being restored to be within the preset temperature range.

In some examples, the processing module 220 is further configured to determine a charging mode with a second preset charging rate or a charging mode with a third preset charging rate to serve as the target charging mode according to the temperature of the battery in response to the number of the charge-discharge cycles reaching the preset number. The charging damage of the charging mode with the second preset charging rate to the battery is lower than the damage of the charging mode with the first preset charging rate to the battery but is larger than the charging damage of the charging mode with the third preset charging rate to the battery, and the second preset charging rate is smaller than the first preset charging rate but is larger than the third preset charging rate.

In some examples, the processing module 220 is further configured to perform at least one of: determining that the charging mode with the third preset charging rate is selected among the at least two charging modes to serve as the target charging mode in response to the number of the charge-discharge cycles reaching the preset number and the temperature of the battery being beyond the preset temperature range; and determining the charging mode with the second preset charging rate to serve as the target charging mode in response to the number of the charge-discharge cycles reaching the preset number and the temperature of the battery being within the preset temperature range.

Figure 2C:
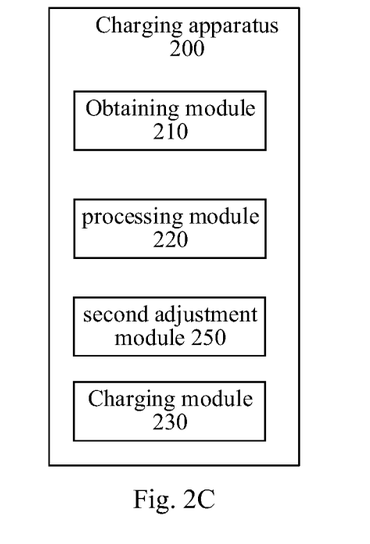
FIG. 2C is schematic structural diagram of a charging apparatus according to a third example.

In some examples, as shown in FIG. 2C, the apparatus 200 further includes: a second adjustment module 250, configured to switch the target charging mode to the charging mode with the second preset charging rate in response to the temperature of the battery being restored to be within the preset temperature range.

In the examples of the present disclosure, the electronic device includes but is not limited to a mobile phone, a tablet PC, a laptop, a TV or a wearable device, etc.

An example of a third aspect of the present disclosure provides an electronic device, including a processor, and a memory, configured to store processor-executable instructions. The processor is configured to: execute steps of the method according to the first aspect of the disclosure.

An example of a fourth aspect of the present disclosure provides a computer readable storage medium, storing a computer program thereon. When an instruction in the storage medium is executed by a processor of an electronic device, the electronic device is enabled to execute and implement steps of the method according to the first aspect of the disclosure.

In an example, a plurality of modules and the like in the charging apparatus may be realized by one or more of central processing units (CPUs), graphics processing units (GPUs), baseband processors (BPs), application specific integrated circuits (ASICs), DSPs, programmable logic devices (PLDs), complex programmable logic devices (CPLDs), field programmable gate arrays (FPGAs), general-purpose processors, controllers, micro controller units (MCUs), microprocessors or other electronic elements for executing the above method.

Figure 3:
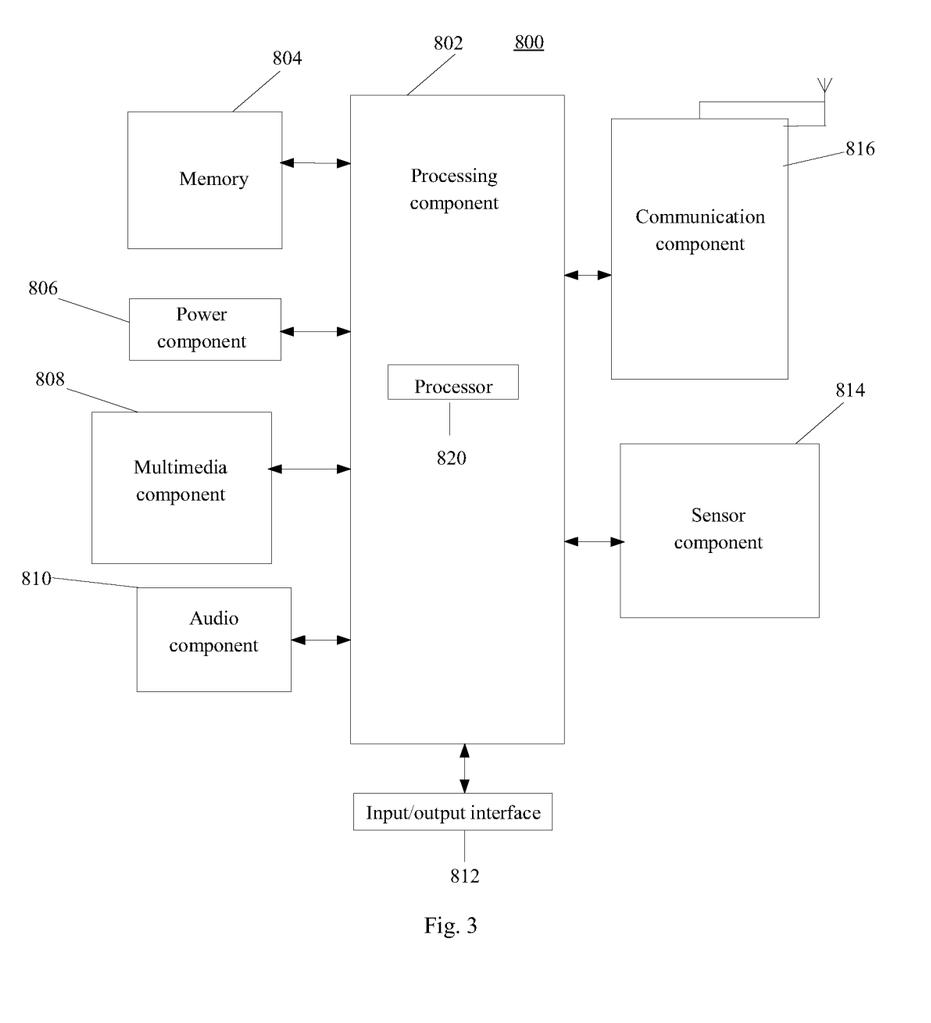
FIG. 3 is a block diagram of a composition structure of an apparatus for charging according to an example.

FIG. 3 is a block diagram of an apparatus 800 for charging according to an example. For example, the apparatus 800 may be a mobile phone, a computer, a digital broadcast terminal, a messaging device, a game console, a tablet device, a medical device, a fitness facility, a personal digital assistant, etc.

Referring to FIG. 3, the apparatus 800 may include one or more components as follows: a processing component 802, a memory 804, a power component 806, a multimedia component 808, an audio component 810, an input/output (I/O) interface 812, a sensor component 814 and a communication component 816.

The processing component 802 generally controls whole operation of the apparatus 800, such as operations related to display, phone call, data communication, camera operation and recording operation. The processing component 802 may include one or more processors 820 for executing instructions so as to complete all or part of steps of the above method. Besides, the processing component 802 may include one or more modules to facilitate interaction between the processing component 802 and the other components. For example, the processing component 802 may include a multimedia module so as to facilitate interaction between the multimedia component 808 and the processing component 802.

The memory 804 is configured to store various data so as to support operations on the apparatus 800. Instances of these data include instructions of any application program or method for operation on the apparatus 800, contact person data, telephone directory data, messages, pictures, videos and the like. The memory 804 may be realized by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 806 provides power for the various components of the apparatus 800. The power component 806 may include a power management system, one or more power sources, and other components related to power generation, management and distribution for the apparatus 800.

The multimedia component 808 includes a screen which provides an output interface between the apparatus 800 and a user. In some examples, the screen may include a liquid crystal display (LCD) and a touch panel (TP). If the screen includes the touch panel, the screen may be realized as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 808 includes a front camera and/or a back camera. When the apparatus 800 is in an operation mode, such as a photographing mode or a video mode, the front camera and/or the back camera can receive external multimedia data. Each front camera and each back camera may be a fixed optical lens system or have a focal length and an optical zoom capability.

The audio component 810 is configured to output and/or input an audio signal. For example, the audio component 810 includes a microphone (MIC). When the apparatus 800 is in the operation mode, such as a call mode, a recording mode and a voice recognition mode, the microphone is configured to receive an external audio signal. The received audio signal may be further stored in the memory 804 or sent via the communication component 816. In some examples, the audio component 810 further includes a speaker for outputting the audio signal.

The I/O interface 812 provides an interface between the processing component 802 and a peripheral interface module, and the peripheral interface module may be a keyboard, a click wheel, buttons and the like. These buttons may include but are not limited to: a home button, a volume button, a start button and a lock button.

The sensor component 814 includes one or more sensors, configured to provide state evaluation of various aspects for the apparatus 800. For example, the sensor component 814 may detect on/off state of the apparatus 800 and relative positioning of the components, and for example, the components are a display and a keypad of the apparatus 800. The sensor component 814 may further detect position change of the apparatus 800 or one component of the apparatus 800, presence or absence of contact between the user and the apparatus 800, orientation or acceleration/deceleration of the apparatus 800, and a temperature change of the apparatus 800. The sensor component 814 may include a proximity sensor, configured to detect existence of a nearby object without any physical contact. The sensor component 814 may further include an optical sensor, such as a CMOS or CCD image sensor, for use in imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the apparatus 800 and the other devices. The apparatus 800 may be accessed to a wireless network that is based on a communication standard, such as WiFi, 4G or 5G or their combination. In an example, the communication component 816 receives a broadcast signal or related broadcast information from an external broadcast management system via a broadcast channel In an example, the communication component 816 further includes a near-field communication (NFC) module so as to facilitate short-range communication. For example, the NFC module may be realized based on a radio frequency identification (RFID) technology, an infra-red data association (IrDA) technology, an ultra wide band (UWB) technology, a Bluetooth (BT) technology and other technologies.

In an example, the apparatus 800 may be realized by one or more of ASICs, digital signal processors (DSPs), digital signal processing device (DSPDs), PLDs, FPGAs, controllers, microcontrollers, microprocessors or other electronic elements for executing the above method.

In an example, a non-transitory computer readable storage medium including instructions is further provided, such as a memory 804 including the instructions. The instructions may be executed by the processor 820 of the apparatus 800 so as to complete the above method. For example, the non-transitory computer readable storage medium may be an ROM, a random access memory (RAM), a CD-ROM, a magnetic tape, a floppy disk, an optical data storage device and the like.

Methods disclosed in the several examples of the method provided by the present disclosure may be combined in any way without a conflict so as to obtain a new example of the method.

Features disclosed in the several examples of the device provided by the present disclosure may be combined in any way without a conflict so as to obtain a new example of a product.

Features disclosed in the several examples of the method or the device provided by the present disclosure may be combined in any way without any conflict so as to obtain a new example of the method or the product.

Those skilled in the art will easily figure out other implementation solutions of the present disclosure after considering the specification and practicing the disclosure disclosed herein. The present disclosure intends to cover any transformation, application or adaptive change of the present disclosure which conform to a general principle of the present disclosure and includes common general knowledge or conventional technical means which are not disclosed by the present disclosure in the technical field. The specification and the examples are only regarded as exemplary, the true scope and spirit of the present disclosure are indicated by the following claims.

It should be understood that the present disclosure is not limited to an accurate structure described above and shown in the drawings, and various modifications and changes may be made without departing from its scope. The scope of the present disclosure is limited only by the appended claims.

What is claimed is:

1. A charging method, comprising:
   obtaining a number of charge-discharge cycles of a battery and an application scenario during charging, wherein the application scenario comprises a scenario in which a state of charge of the battery is lower than a power threshold, a scenario in which an indication of emergency charging is detected, a scenario in which the state of charge of the battery is not lower than the power threshold, and a scenario in which the indication of the emergency charging is not detected;
   determining a target charging mode among at least two charging modes according to whether the number of the charge-discharge cycles reaches a preset number and according to the application scenario, wherein different charging modes have different charging rates, and the charging modes with different charging rates have different charging damages to the battery; and
   charging the battery in the target charging mode.

2. The method according to claim 1, wherein determining the target charging mode among the at least two charging modes according to whether the number of the charge-discharge cycles reaches the preset number and according to the application scenario, comprises:
   determining whether a charging mode with a first preset charging rate is selected among the at least two charging modes to serve as the target charging mode according to a temperature of the battery in response to the number of the charge-discharge cycles not reaching the preset number and the application scenario being a first type of charging scenario, and
   wherein the first type of charging scenario being the scenario in which the state of charge of the battery is lower than the power threshold, or the scenario in which the indication of emergency charging is detected.

3. The method according to claim 2, wherein determining the target charging mode among the at least two charging modes according to whether the number of the charge-discharge cycles reaches the preset number and according to the application scenario comprises:
   determining that a charging mode with a charging rate being lower than the first preset charging rate is selected among the at least two charging modes to serve as the target charging mode in response to the number of the charge-discharge cycles not reaching the preset number and the application scenario is a second type of charging scenario, and
   wherein the second type of charging scenario being the scenario in which the state of charge of the battery is not lower than the power threshold, or the scenario in which the indication of the emergency charging is not detected.

4. The method according to claim 2, wherein determining whether the charging mode with the first preset charging rate is selected among the at least two charging modes to serve as the target charging mode according to the temperature of the battery in response to the number of the charge-discharge cycles not reaching the preset number and the application scenario being the first type of charging scenario, comprises at least one of:
   determining that the charging mode with the first preset charging rate is selected among the at least two charging modes to serve as the target charging mode in response to the temperature of the battery being within a preset temperature range, wherein the preset temperature range is a temperature range in which a cycle life of the battery will be better protected when charging; or
   determining that a charging mode with the charging rate lower than the first preset charging rate is selected among the at least two charging modes to serve as the target charging mode in response to the temperature of the battery being beyond the preset temperature range.

5. The method according to claim 4, after determining that the charging mode with the charging rate lower than the first preset charging rate is selected among the at least two charging modes to serve as the target charging mode in response to the application scenario being the first type of charging scenario and the temperature of the battery being beyond the preset temperature range, further comprising:
   switching the target charging mode to the charging mode with the first preset charging rate in response to the temperature of the battery being restored to be within the preset temperature range.

6. The method according to claim 2, wherein determining the target charging mode among the at least two charging modes according to whether the number of the charge-discharge cycles reaches the preset number and according to the application scenario comprises:

determining a charging mode with a second preset charging rate or a charging mode with a third preset charging rate to serve as the target charging mode according to the temperature of the battery in response to the number of the charge-discharge cycles reaching the preset number, and  wherein the charging damage of the charging mode with the second preset charging rate to the battery is lower than the damage of the charging mode with the first preset charging rate to the battery but is larger than the charging damage of the charging mode with the third preset charging rate to the battery, and the second preset charging rate is smaller than the first preset charging rate but is larger than the third preset charging rate.

7. The method according to claim 6, wherein determining the charging mode with the second preset charging rate or the charging mode with the third preset charging rate to serve as the target charging mode according to the temperature of the battery in response to the number of the charge-discharge cycles reaching the preset number, comprises at least one of:

determining that the charging mode with the third preset charging rate is selected among the at least two charging modes to serve as the target charging mode in response to the number of the charge-discharge cycles reaching the preset number and the temperature of the battery being beyond a preset temperature range; or  determining the charging mode with the second preset charging rate to serve as the target charging mode in response to the number of the charge-discharge cycles reaching the preset number and the temperature of the battery being within the preset temperature range.

8. The method according to claim 7, after determining the charging mode with the third preset charging rate to serve as the target charging mode in response to the number of the charge-discharge cycles reaching the preset number and the temperature of the battery being beyond the preset temperature range, further comprising:

switching the target charging mode to the charging mode with the second preset charging rate in response to the temperature of the battery being restored to be within the preset temperature range.

9. The method according to claim 1, wherein the charging rates of the charging modes are inversely correlated to the charging damages of the charging modes to the battery.

10. An electronic device, comprising:

a processor; and a memory, configured to store processor-executable instructions;

wherein the processor is configured to:

obtain a number of charge-discharge cycles of a battery and an application scenario during charging, wherein the application scenario comprises a scenario in which a state of charge of the battery is lower than a power threshold, a scenario in which an indication of emergency charging is detected, a scenario in which the state of charge of the battery is not lower than the power threshold, and a scenario in which the indication of the emergency charging is not detected;

determine a target charging mode among at least two charging modes according to whether the number of the charge-discharge cycles reaches a preset number and according to the application scenario, wherein different charging modes have different charging rates, and the charging modes with different charging rates have different charging damages to the battery; and  charge the battery in the target charging mode.

11. The electronic device according to claim 10, wherein the processor is configured to:

determine whether a charging mode with a first preset charging rate is selected among the at least two charging modes to serve as the target charging mode according to a temperature of the battery in response to the number of the charge-discharge cycles not reaching the preset number and the application scenario being a first type of charging scenario, and  wherein the first type of charging scenario being the scenario in which the state of charge of the battery is lower than the power threshold, or the scenario in which the indication of emergency charging is detected.

12. The electronic device according to claim 11, wherein the processor is configured to:

determine that a charging mode with a charging rate being lower than the first preset charging rate is selected among the at least two charging modes to serve as the target charging mode in response to the number of the charge-discharge cycles not reaching the preset number and the application scenario is a second type of charging scenario, and  wherein the second type of charging scenario being the scenario in which the state of charge of the battery is not lower than the power threshold, or the scenario in which the indication of the emergency charging is not detected.

13. The electronic device according to claim 11, wherein the processor is configured to perform at least one of:

determining that the charging mode with the first preset charging rate is selected among the at least two charging modes to serve as the target charging mode in response to the temperature of the battery being within a preset temperature range, wherein the preset temperature range is a temperature range in which a cycle life of the battery will be better protected when charging; or  determining that a charging mode with the charging rate lower than the first preset charging rate is selected among the at least two charging modes to serve as the target charging mode in response to the temperature of the battery being beyond the preset temperature range.

14. The electronic device according to claim 13, wherein the processor is configured to:

switch the target charging mode to the charging mode with the first preset charging rate in response to the temperature of the battery being restored to be within the preset temperature range.

15. The electronic device according to claim 11, wherein the processor is configured to:

determine a charging mode with a second preset charging rate or a charging mode with a third preset charging rate to serve as the target charging mode according to the temperature of the battery in response to the number of the charge-discharge cycles reaching the preset number, and  wherein the charging damage of the charging mode with the second preset charging rate to the battery is lower than the damage of the charging mode with the first preset charging rate to the battery but is larger than the charging damage of the charging mode with the third preset charging rate to the battery, and the second preset charging rate is smaller than the first preset charging rate but is larger than the third preset charging rate.

16. The electronic device according to claim 15, wherein the processor is configured to perform at least one of:
- determining that the charging mode with the third preset charging rate is selected among the at least two charging modes to serve as the target charging mode in response to the number of the charge-discharge cycles reaching the preset number and the temperature of the battery being beyond a preset temperature range; or
- determining the charging mode with the second preset charging rate to serve as the target charging mode in response to the number of the charge-discharge cycles reaching the preset number and the temperature of the battery being within the preset temperature range.

17. The electronic device according to claim 16, wherein the processor is configured to:
- switch the target charging mode to the charging mode with the second preset charging rate in response to the temperature of the battery being restored to be within the preset temperature range.

18. The electronic device according to claim 10, wherein the charging rates of the charging modes are inversely correlated to the charging damages of the charging modes to the battery.

19. A non-transitory computer readable storage medium, storing a computer program, wherein when an instruction in the storage medium is executed by a processor of an electronic device, the electronic device is configured to:
- obtain a number of charge-discharge cycles of a battery and an application scenario during charging, wherein the application scenario comprises a scenario in which a state of charge of the battery is lower than a power threshold, a scenario in which an indication of emergency charging is detected, a scenario in which the state of charge of the battery is not lower than the power threshold, and a scenario in which the indication of the emergency charging is not detected;
- determine a target charging mode among at least two charging modes according to whether the number of the charge-discharge cycles reaches a preset number and according to the application scenario, wherein different charging modes have different charging rates, and the charging modes with different charging rates have different charging damages to the battery; and
- charge the battery in the target charging mode.

* * * * *

UNITED STATES PATENT AND TRADEMARK OFFICE
CERTIFICATE OF CORRECTION

| | | |
|---|---|---|
| PATENT NO. | : 12,355,293 B2 | Page 1 of 1 |
| APPLICATION NO. | : 17/681089 | |
| DATED | : July 8, 2025 | |
| INVENTOR(S) | : Jinlong Zhang et al. | |

It is certified that error appears in the above-identified patent and that said Letters Patent is hereby corrected as shown below:

In the Specification
In Column 7, Line 49, delete "preset" and insert -- present --, therefor.

Signed and Sealed this
Sixteenth Day of September, 2025

Coke Morgan Stewart
*Acting Director of the United States Patent and Trademark Office*